United States Patent
Beavis et al.

(10) Patent No.: US 9,624,084 B2
(45) Date of Patent: *Apr. 18, 2017

(54) SYSTEM AND METHOD FOR GENERATING A DRIVE SIGNAL

(71) Applicant: DEKA Products Limited Partnership, Manchester, NH (US)

(72) Inventors: Russell H. Beavis, Merrimack, NH (US); James J. Dattolo, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,138

(22) Filed: Jan. 4, 2016

(65) Prior Publication Data

US 2016/0137477 A1 May 19, 2016

Related U.S. Application Data

(63) Continuation of application No. 14/492,681, filed on Sep. 22, 2014, now Pat. No. 9,227,826, which is a continuation of application No. 13/346,288, filed on Jan. 9, 2012, now Pat. No. 8,839,989, which is a continuation of application No. 13/047,125, filed on Mar. 14, 2011, now Pat. No. 8,091,736, which is a (Continued)

(51) Int. Cl.
*B67D 1/00* (2006.01)
*B67D 1/08* (2006.01)
*F04B 13/02* (2006.01)
*F04B 49/06* (2006.01)
*F04B 51/00* (2006.01)
*B67D 1/10* (2006.01)
*G05B 15/02* (2006.01)

(52) U.S. Cl.
CPC ......... *B67D 1/0034* (2013.01); *B67D 1/0888* (2013.01); *B67D 1/10* (2013.01); *F04B 13/02* (2013.01); *F04B 49/065* (2013.01); *F04B 51/00* (2013.01); *G05B 15/02* (2013.01)

(58) Field of Classification Search
CPC ........ F04B 51/00; F04B 49/065; F04B 13/02; B67D 1/0888; B67D 1/0034; B67D 1/10; G05B 15/02
See application file for complete search history.

(56) References Cited

U.S. PATENT DOCUMENTS 7,740,152 B2 * 6/2010 Hughes .................... F04B 13/02
222/1
7,905,373 B2 * 3/2011 Beavis ..................... F04B 13/02
222/1

(Continued)

*Primary Examiner* — Frederick C Nicolas
(74) *Attorney, Agent, or Firm* — Michelle Saquet Temple

(57) ABSTRACT

A method and computer program product for defining a PWM drive signal having a defined voltage potential. The PWM drive signal has a plurality of "on" portions and a plurality of "off" portions that define a first duty cycle for regulating, at least in part, a flow rate of a pump assembly. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

22 Claims, 8 Drawing Sheets

Related U.S. Application Data continuation of application No. 11/851,344, filed on Sep. 6, 2007, now Pat. No. 7,905,373, which is a continuation-in-part of application No. 11/276,548, filed on Mar. 6, 2006, now Pat. No. 7,740,152.

(56) References Cited

U.S. PATENT DOCUMENTS

| | | | | |
|---|---|---|---|---|
| 8,091,736 B2* | 1/2012 | Beavis | ............... | F04B 13/02 222/129.1 |
| 8,839,989 B2* | 9/2014 | Beavis | ............... | F04B 13/02 222/129.1 |
| 9,227,826 B2* | 1/2016 | Beavis | ............... | F04B 13/02 |

* cited by examiner

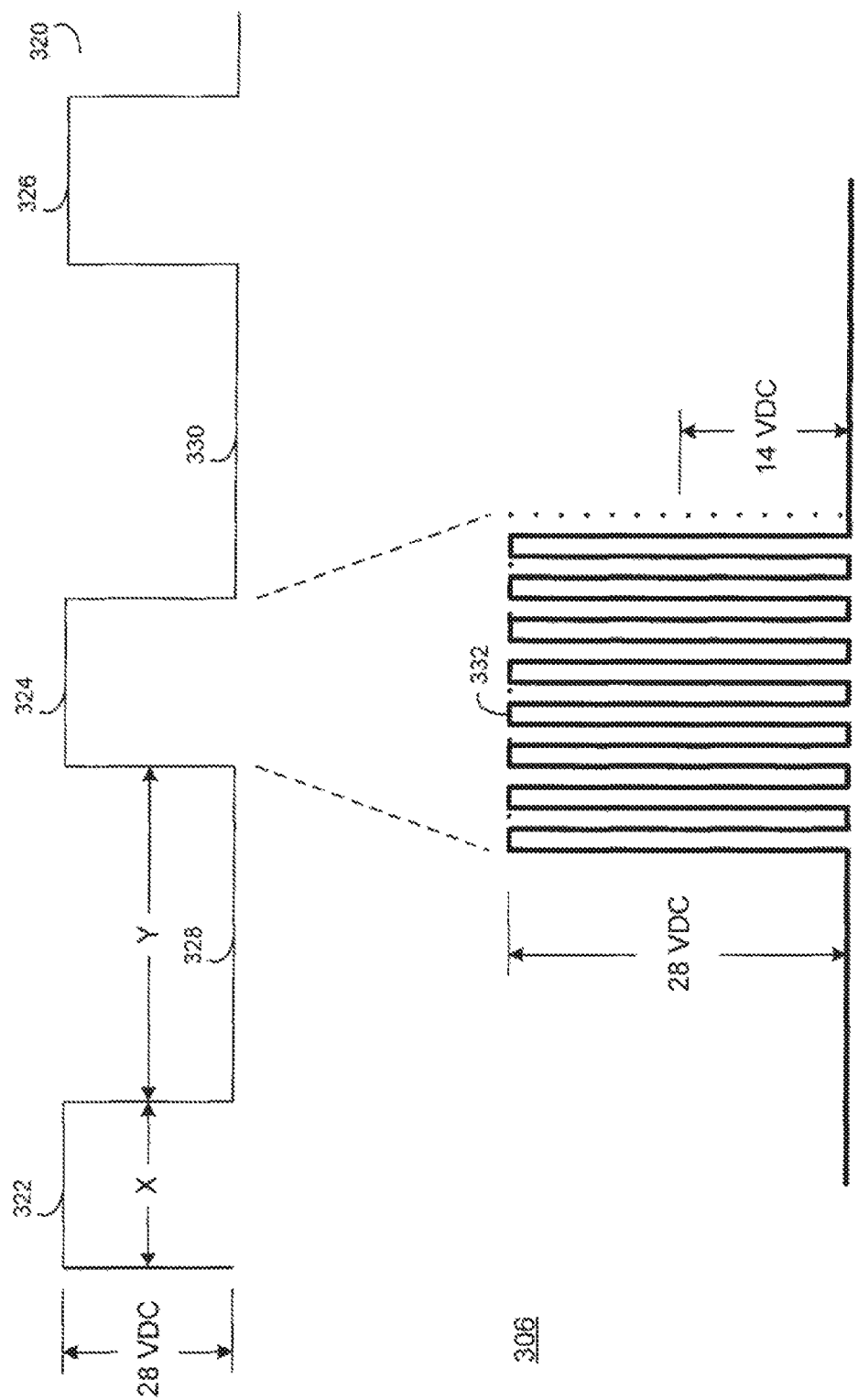

SYSTEM AND METHOD FOR GENERATING A DRIVE SIGNAL

CROSS-REFERENCE TO RELATED APPLICATIONS

The present application Continuation Application of U.S. patent application Ser. No. 14/492,681, filed Sep. 22, 2014 and entitled System and Method for Generating a Drive Signal, now U.S. Pat. No. 9,227,826, issued Jan. 5, 2016, which is a Continuation Application of U.S. patent application Ser. No. 13/346,288, filed Jan. 9, 2012 and entitled System And Method For Generating A Drive Signal, now U.S. Pat. No. 8,839,989, issued Sep. 23, 2014, which is a Continuation Application of U.S. patent application Ser. No. 13/047,125, filed Mar. 14, 2011 and entitled System And Method For Generating A Drive Signal, now U.S. Pat. No. 8,091,736 issued Jan. 10, 2012, which is a Continuation Application of U.S. patent application Ser. No. 11/851,344, filed Sep. 6, 2007 and entitled System And Method For Generating A Drive Signal, now U.S. Pat. No. 7,905,373 issued Mar. 15, 2011, which is a Continuation-in-Part Application of U.S. patent application Ser. No. 11/276,548, filed Mar. 6, 2006 and entitled Pump System With Calibration Curve, now U.S. Pat. No. 7,740,152, issued Jun. 22, 2010, all of which are hereby incorporated herein by reference in their entireties.

TECHNICAL FIELD

This disclosure relates to dispensing machines and, more particularly, to food product dispensing machines.

BACKGROUND INFORMATION

Beverage dispensing machines typically combine one or more concentrated syrups (e.g. cola flavoring and a sweetener) with water (e.g., carbonated or non-carbonated water) to form a soft drink. Unfortunately, the variety of soft drinks offered by a particular beverage dispensing machine may be limited by the internal plumbing in the machine, which is often hard-plumbed and therefore non-configurable.

Accordingly, a typical beverage dispensing machine may include a container of concentrated cola syrup, a container of concentrated lemon-lime syrup, a container of concentrated root beer syrup, a water inlet (i.e. for attaching to a municipal water supply), and a carbonator (e.g. for converting noncarbonated municipal water into carbonated water).

Unfortunately, such beverage dispensing machines offer little in terms of product variety/customization. Additionally as the internal plumbing on such beverage dispensing machines is often hard-plumbed and the internal electronics are often hardwired, the ability of such beverage dispensing machines to offer a high level of variety/customization concerning beverage choices is often compromised.

SUMMARY

In a first implementation, a method includes defining a PWM drive signal having a defined voltage potential. The PWM drive signal has a plurality of "on" portions and a plurality of "off" portions that define a first duty cycle for regulating, at least in part, a flow rate of a pump assembly. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

One or more of the following features may be included. The pump assembly may be a solenoid piston pump. The pump assembly may be configured for use within a beverage dispensing system.

The pump assembly may be configured to releasably engage a product container. The pump assembly may be rigidly attached to a product module assembly. The defined voltage potential may be 28 VDC.

At least one of the "on" portions of the PWM drive signal may have a duration of approximately 15 milliseconds. At least one of the "off" portions of the PWM drive signal may have a duration within a range of 15-185 milliseconds. The second duty cycle may be within a range of 50-100%.

In another implementation, a computer program product resides on a computer readable medium that has a plurality of instructions stored on it. When executed by a processor, the instructions cause the processor to perform operations including defining a PWM drive signal having a defined voltage potential. The PWM drive signal has a plurality of "on" portions and a plurality of "off" portions that define a first duty cycle for regulating, at least in part, a flow rate of a pump assembly. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

One or more of the following features may be included. The pump assembly may be a solenoid piston pump. The pump assembly may be configured for use within a beverage dispensing system.

At least one of the "on" portions of the PWM drive signal may have a duration of approximately 15 milliseconds. At least one of the "off" portions of the PWM drive signal may have a duration within a range of 15-185 milliseconds. The second duty cycle may be within a range of 50-100%.

In another implementation, a method includes defining a PWM drive signal having a defined voltage potential. The PWM drive signal has a plurality of "on" portions and a plurality of "off" portions that define a first duty cycle for regulating, at least in part, a flow rate of a pump assembly included within a beverage dispensing system. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

One or more of the following features may be included. The pump assembly may be a solenoid piston pump. The pump assembly may be configured to releasably engage a product container. The pump assembly may be rigidly attached to a product module assembly. At least one of the "on" portions of the PWM drive signal may have a duration of approximately 15 milliseconds. At least one of the "off" portions of the PWM drive signal may have a duration within a range of 15-185 milliseconds. The second duty cycle may be within a range of 50-100%.

The details of one or more implementations are set forth in the accompanying drawings and the description below. Other features and advantages will become apparent from the description, the drawings and the claims.

BRIEF DESCRIPTION OF THE DRAWINGS

FIG. 4C is a diagrammatic view of a drive signal as applied to a pump assembly included within the micro ingredient subsystem of FIG. 4A;

Like reference symbols in the various drawings indicate like elements.

DETAILED DESCRIPTION OF THE EXEMPLARY EMBODIMENTS

Figure 1:
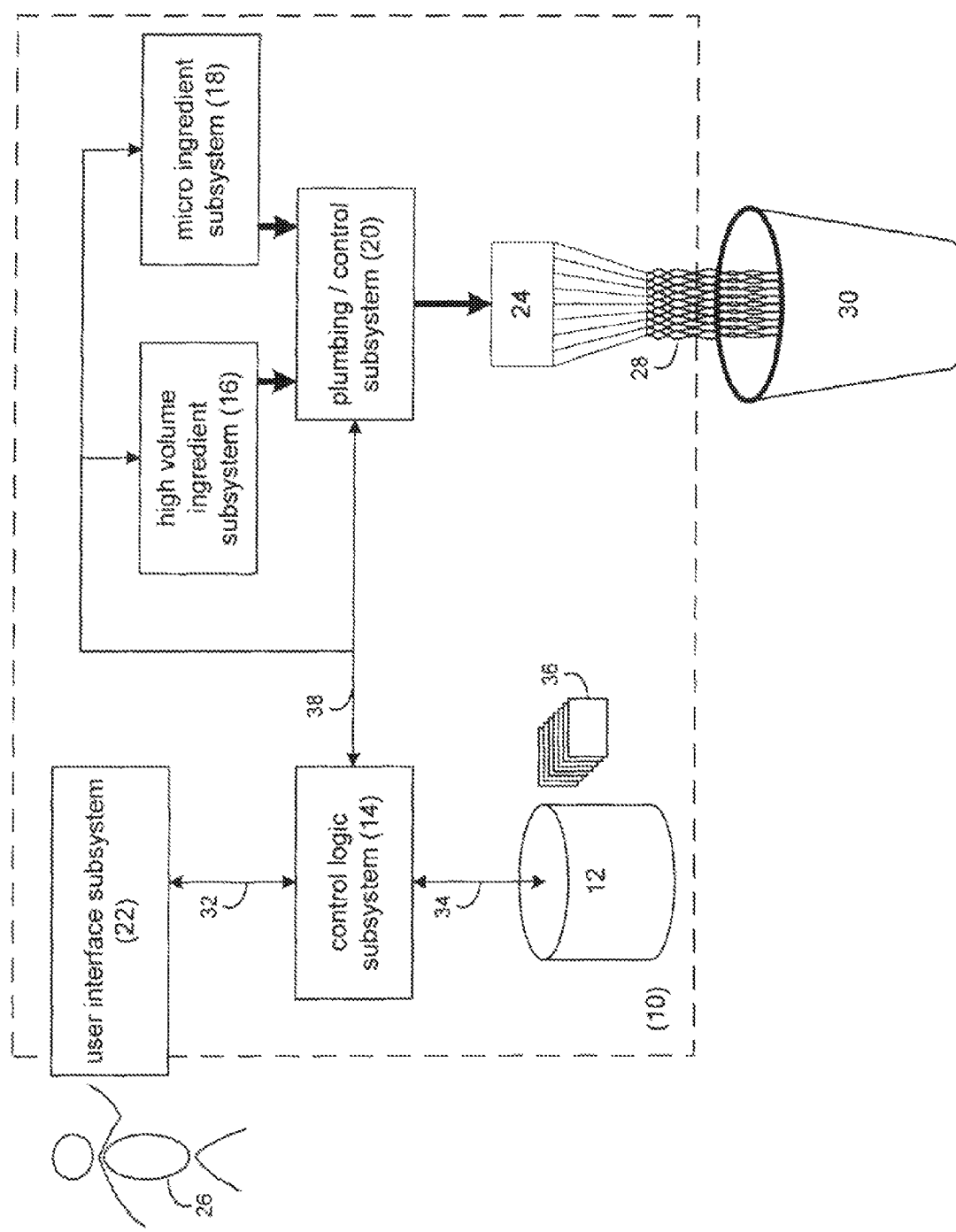
FIG. 1 is a diagrammatic view of a beverage dispensing system.

Referring to FIG. 1, there is shown a generalized-view of beverage dispensing system 10 that is shown to include a plurality of subsystems namely: storage subsystem 12, control logic subsystem 14, high volume ingredient subsystem 16, micro-ingredient subsystem 18, plumbing/control subsystem 20, user interface subsystem 22, and nozzle 24. Each of the above describes subsystems 12, 14, 16, 18, 20, 22 will be described below in greater detail.

During use of beverage dispensing system 10, user 26 may select a particular beverage 28 for dispensing (into container 30) using user interface subsystem 22. Via user interface subsystem 22, user 26 may select one or more options for inclusion within such beverage. For example, options may include but are not limited to the addition of one or more flavorings (e.g. lemon flavoring, lime flavoring, chocolate flavoring, and vanilla flavoring) into a beverage; the addition of one or more nutraceuticals (e.g. Vitamin A, Vitamin C, Vitamin D, Vitamin E, Vitamin $B_6$, Vitamin $B_{12}$, and Zinc) into a beverage; the addition of one or more other beverages (e.g. coffee, milk, lemonade, and iced tea) into a beverage; and the addition of one or more food products (e.g. ice cream) into a beverage.

Once user 26 makes the appropriate selections, via user interface subsystem 22, user interface subsystem 22 may send the appropriate data signals (via data bus 32) to control logic subsystem 14. Control logic subsystem 14 may process these data signals and may retrieve (via data bus 34) one or more recipes chosen from plurality of recipes 36 maintained on storage subsystem 12. Upon retrieving the recipe(s) from storage subsystem 12, control logic subsystem 14 may process the recipe(s) and provide the appropriate control signals (via data bus 38) to e.g. high volume ingredient subsystem 16 micro-ingredient subsystem 18 and plumbing/control subsystem 20, resulting in the production of beverage 28 (which is dispensed into container 30).

Figure 2:
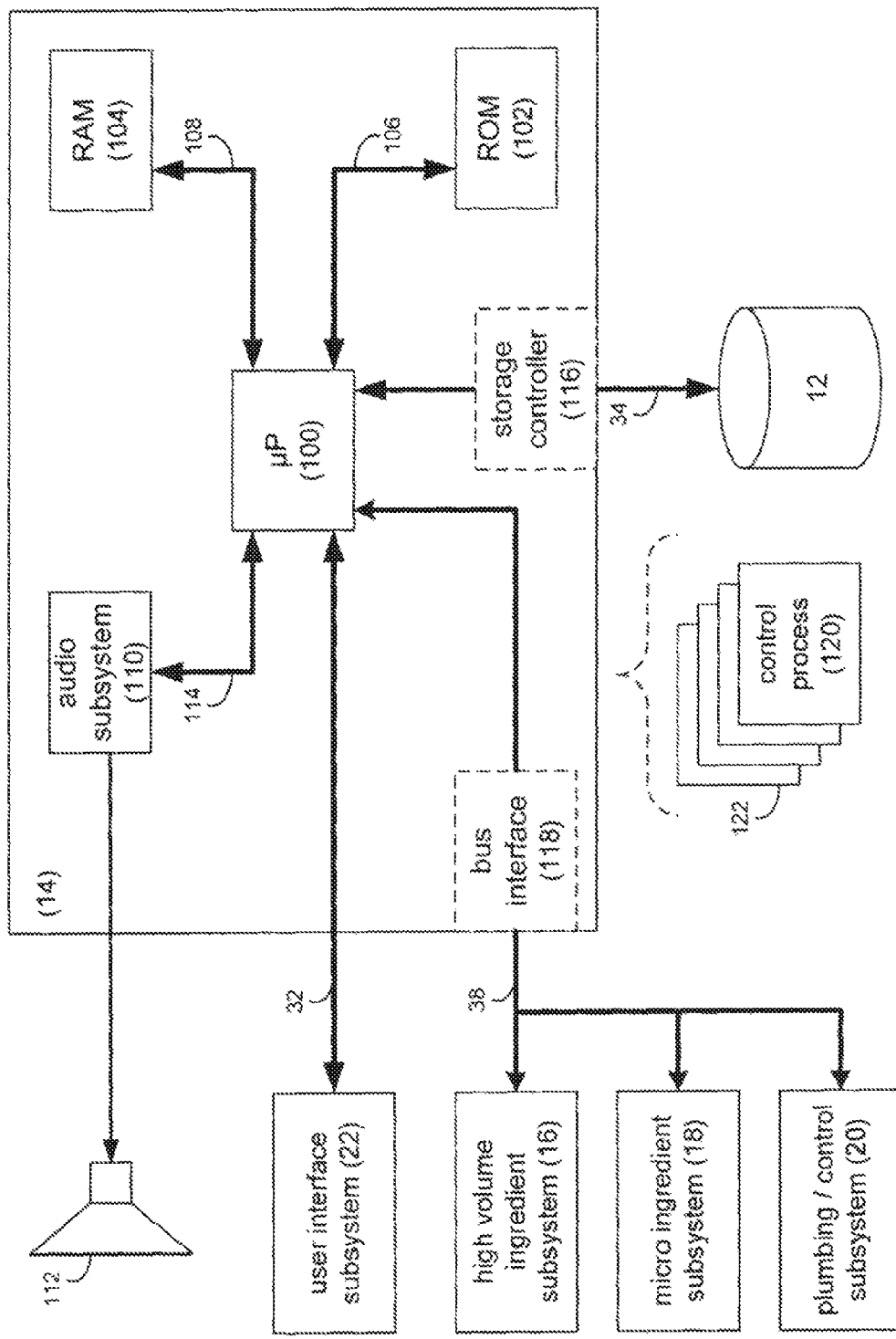
FIG. 2 is a diagrammatic view of a control logic subsystem included within the beverage dispensing system of FIG. 1.

Referring also to FIG. 2, a diagrammatic view of control logic subsystem 14 is shown. Control logic subsystem 14 may include microprocessor 100 (e.g., an ARM™ microprocessor produced by Intel Corporation of Santa Clara, Calif.), nonvolatile memory (e.g. read only memory 102), and volatile memory (e.g. random access memory 104); each of which may be interconnected via one or more data/system buses 106, 108. As discussed above, user interface subsystem 22 may be coupled to control logic subsystem 14 via data bus 32.

Control logic subsystem 14 may also include an audio subsystem 110 for providing e.g. an analog audio signal to speaker 112, which may be incorporated into beverage dispensing system 10. Audio subsystem 110 may be coupled to microprocessor 100 via data/system bus 114.

Control logic subsystem 14 may execute an operating system, examples of which may include but are not limited to Microsoft Windows CE™, Redhat Linux™, Palm OS™, or a device-specific (i.e., custom) operating system.

The instruction sets and subroutines of the above-described operating system, which may be stored on storage subsystem 12, may be executed by one or more processors (e.g. microprocessor 100) and one or more memory architectures (e.g. read-only memory 102 and/or random access memory 104) incorporated into control logic subsystem 14.

Storage subsystem 12 may include, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

As discussed above, storage subsystem 12 may be coupled to control logic subsystem 14 via data bus 34. Control logic subsystem 14 may also include storage controller 116 (shown in phantom) for converting signals provided by microprocessor 100 into a format usable by storage system 12. Further, storage controller 116 may convert signals provided by storage subsystem 12 into a format usable by microprocessor 100.

As discussed above, high-volume ingredient subsystem 16, micro-ingredient subsystem 18 and/or plumbing/control subsystem 20 may be coupled to control logic subsystem 14 via data bus 38. Control logic subsystem 14 may include bus interface 118 (shown in phantom) for converting signals provided by microprocessor 100 into a format usable by high-volume ingredient subsystem 16, micro-ingredient subsystem 18 and/or plumbing/control subsystem 20. Further, bus interface 118 may convert signals provided by high-volume ingredient subsystem 16, micro-ingredient subsystem 18 and/or plumbing/control subsystem 20 into a format usable by microprocessor 100.

As will be discussed below in greater detail, control logic subsystem 14 may execute one or more control processes 120 that may control the operation of beverage dispensing system 10. The instruction sets and subroutines of control processes 120, which may be stored on storage subsystem 12, may be executed by one or more processors (e.g. microprocessor 100) and one or more memory architectures (e.g. read-only memory 102 and/or random access memory 104) incorporated into control logic subsystem 14.

Figure 3:
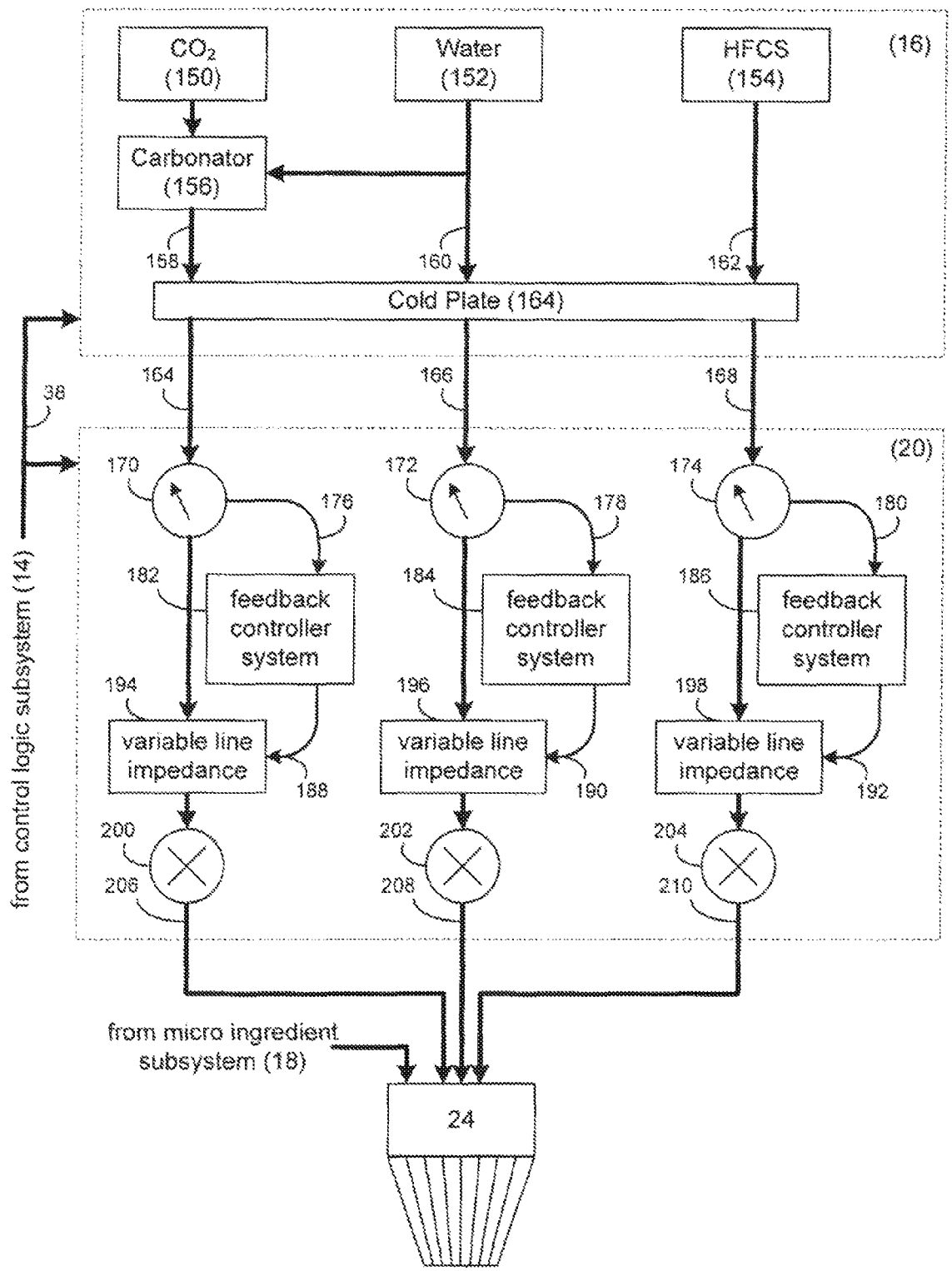
FIG. 3 is a diagrammatic view of a high volume ingredient subsystem included within the beverage dispensing system of FIG. 1.

Referring also to FIG. 3, a diagrammatic view of high-volume ingredient subsystem 16 and plumbing/control subsystem 20 are shown. High-volume ingredient subsystem 16 may include containers for housing consumables that are used at a rapid rate when making beverage 28. For example, high-volume ingredient subsystem 16 may include carbon dioxide supply 150, water supply 152, and high fructose corn syrup supply 154. An example of carbon dioxide supply 150 may include but is not limited to a tank (not shown) of compressed, gaseous carbon dioxide. An example of water supply 152 may include but is not limited to a municipal water supply (not shown). An example of high fructose corn syrup supply 154 may include but is not limited to a tank (not shown) of highly-concentrated, high fructose corn syrup.

High-volume, ingredient subsystem 16 may include a carbonator 156 for generating carbonated water from carbon dioxide gas (provided by carbon dioxide supply 150) and water (provided by water supply 152). Carbonated water 158, water 160 and high fructose corn syrup 162 may be provided to cold plate assembly 164. Cold plate assembly 164 may be designed to chill carbonated water 158, water 160, and high fructose corn syrup 162 down to a desired serving temperature (e.g. 40° F.).

While a single cold plate 164 is shown to chill carbonated water 158, water 160, and high fructose corn syrup 162, this is for illustrative purposes only and is not intended to be a limitation of disclosure, as other configurations are possible. For example, an individual cold plate may be used to chill each of carbonated water 158, water 160 and high fructose corn syrup 162. Once chilled, chilled carbonated water 164, chilled water 166, and chilled high fructose corn syrup 168 may be provided to plumbing/control subsystem 20.

For illustrative purposes, plumbing/control subsystem 20 is shown to include three flow measuring devices 170, 172, 174, which measure the volume of chilled carbonated water 164, chilled water 166 and chilled high fructose corn syrup 168 (respectively). Flow measuring devices 170, 172, 174 may provide feedback signals 176, 178, 180 (respectively) to feedback controller systems 182, 184, 186 (respectively).

Feedback controller systems 182, 184, 186 (which will be discussed below in greater detail) may compare flow feedback signals 176, 178, 180 to the desired flow volume (as defined for each of chilled carbonated water 164, chilled water 166 and chilled high fructose corn syrup 168; respectively). Upon processing flow feedback signals 176, 178, 180, feedback controller systems 182, 184, 186 (respectively) may generate flow control signals 188, 190, 192 (respectively) that may be provided to variable line impedances 194, 196, 198 (respectively). Examples of variable line impedance 194, 196, 198 are disclosed and claimed in U.S. Pat. No. 5,755,683 (Attached hereto as Appendix A), U.S. patent application Ser. No. 11/559,792 (Attached hereto as Appendix B) and U.S. patent application Ser. No. 11/851,276 (Attached hereto as Appendix C). Variable line impedances 194, 196, 198 may regulate the flow of chilled carbonated water 164, chilled water 166 and chilled high fructose corn syrup 168 passing through lines 206, 208, 210 (respectively), which are provided to nozzle 24 and (subsequently) container 30.

Lines 206, 208, 210 may additionally include solenoid valves 200, 202, 204 (respectively) for preventing the flow of fluid through lines 206, 208, 210 during times when fluid flow is not desired/required (e.g. during shipping, maintenance procedures, and downtime).

As discussed above, FIG. 3 merely provides an illustrative view of plumbing/control subsystem 20. Accordingly, the manner in which plumbing/control subsystem 20 is illustrated is not intended to be a limitation of this disclosure, as other configurations are possible. For example, some or all of the functionality of feedback controller systems 182, 184, 186 may be incorporated into control logic subsystem 14.

Figure 4A:
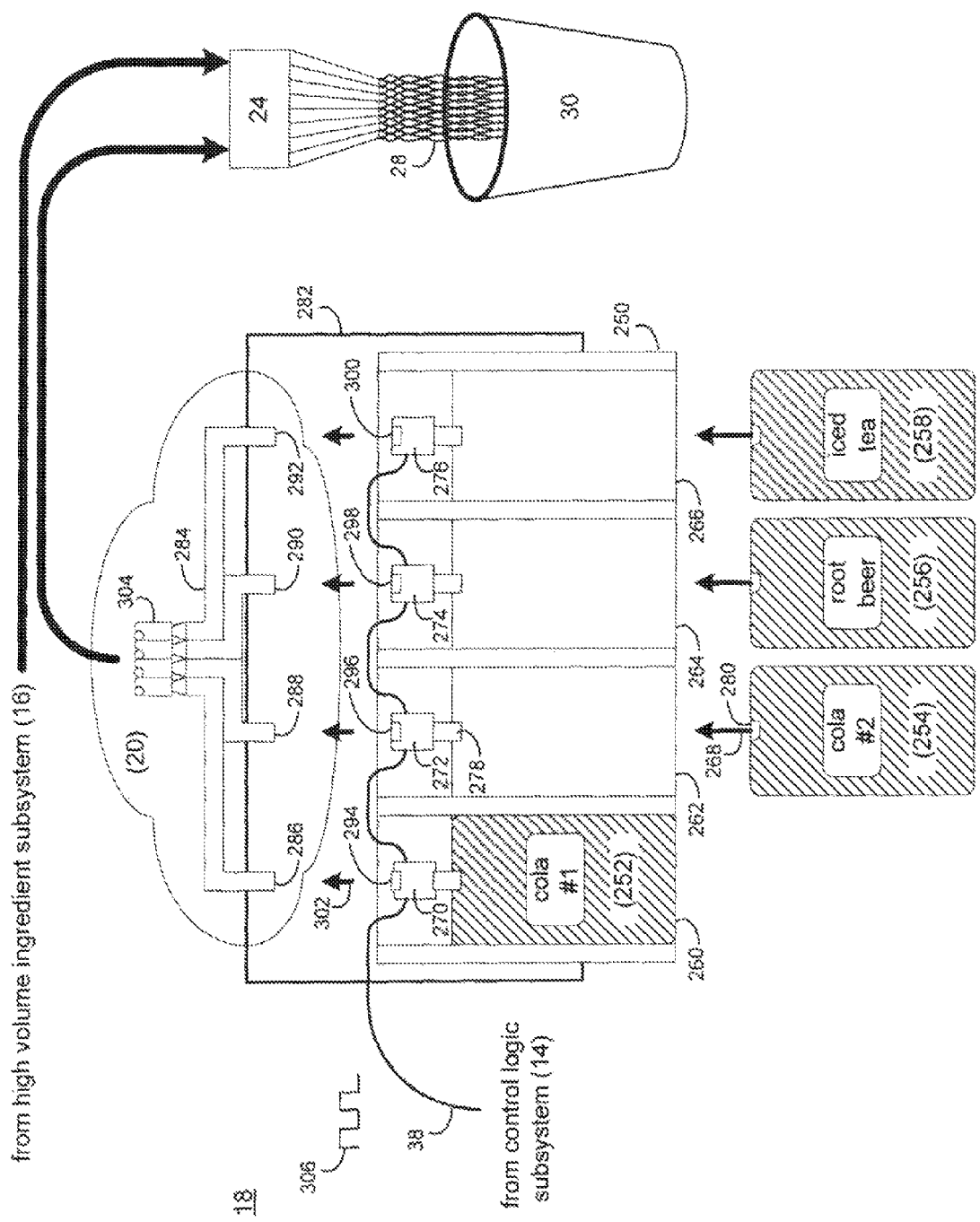
FIG. 4A is a diagrammatic view of a micro ingredient subsystem included within the beverage dispensing system of FIG. 1.

Referring also to FIG. 4A, a diagrammatic top-view of micro-ingredient subsystem 18 and plumbing/control subsystem 20 is shown. Micro-ingredient subsystem 18 may include product module assembly 250, which may be configured to releasably engage one or more product containers 252, 254, 256, 258, which may be configured to hold micro-ingredients for use when making beverage 28. Examples of such micro-ingredients may include but are not limited to a first portion of a cola syrup, a second portion of a cola syrup, a root beer syrup, and an iced tea syrup.

Product module assembly 250 may include a plurality of slot assemblies 260, 262, 264, 266 configured to releasably engage plurality of product containers 252, 254, 256, 258. In this particular example, product module assembly 250 is shown to include four slot assemblies (namely slots 260, 262, 264, 266) and, therefore, may be referred to as a quad product module assembly. When positioning one or more of product containers 252, 254, 256, 258 within product module assembly 250, a product container (e.g. product container 254) may be slid into a slot assembly (e.g. slot assembly 262) in the direction of arrow 268.

For illustrative purposes, each slot assembly of product module assembly 250 is shown to include a pump assembly. For example, slot assembly 252 shown to include pump assembly 270; slot assembly 262 shown to include pump assembly 272; slot assembly 264 is shown to include pump assembly 274; and slot assembly 266 is shown to include pump assembly 276.

Each of pump assemblies 270, 272, 274, 276 may include an inlet port for releasably engaging a product orifice included within the product container. For example, pump assembly 272 a shown to include inlet port 278 that is configured to releasably engage container orifice 280 included within product container 254. Inlet port 278 and/or product orifice 280 may include one or more O-ring assemblies (not shown) to facilitate a leakproof seal.

An example of one or more of pump assembly 270, 272, 274, 276 may include but is not limited to a solenoid piston pump assembly that provides a defined and consistent amount of fluid each time that one or more of pump assemblies 270, 272, 274, 276 are energized. Such pumps are available from ULKA Costruzioni Elettromeccaniche S.p.A. of Pavia, Italy. For example, each time a pump assembly (e.g. pump assembly 274) is energized by control logic subsystem 14 via data bus 38, the pump assembly may provide 1.00 mL of the root beer syrup included within product container 256.

Other examples of pump assemblies 270, 272, 274, 276 and various pumping techniques are described in U.S. Pat. No. 4,808,161 (Attached hereto as Appendix D); U.S. Pat. No. 4,826,482 (Attached hereto as Appendix E); U.S. Pat. No. 4,976,162 (Attached hereto as Appendix F); U.S. Pat. No. 5,088,515 (Attached hereto as Appendix G); and U.S. Pat. No. 5,350,357 (Attached hereto as Appendix H).

Product module assembly 250 may be configured to releasably engage bracket assembly 282. Bracket assembly 282 may be a portion of (and rigidly fixed within) beverage dispensing system 10. An example of bracket assembly 282 may include but is not limited to a shelf within beverage dispensing system 10 that is configured to releasably engage product module 250. For example, product module 250 may include a engagement device (e.g. a clip assembly, a slot assembly, a latch assembly, a pin assembly; not shown) that is configured to releasably engage a complementary device that is incorporated into bracket assembly 282.

Plumbing/control subsystem 20 may include manifold assembly 284 that may be rigidly affixed to bracket assembly 282. Manifold assembly 284 may be configured to include a plurality of inlet ports 286, 288, 290, 292 that are configured to releasably engage a pump orifice (e.g. pump orifices 294, 296, 298, 300) incorporated into each of pump assemblies 270, 272, 274, 276. When positioning product module 250 on bracket assembly 282, product module 250 may be moved in the direction of the arrow 302, thus allowing for inlet ports 286, 288, 290, 292 to releasably engage pump orifices 294, 296, 298, 300. Inlet ports 286, 288, 290, 292 and/or pump orifices 294, 296, 298, 300 may include one or more O-ring assemblies (not shown) to facilitate a leakproof seal.

Manifold assembly 284 may be configured to engage tubing bundle 304, which may be plumbed (either directly or indirectly) to nozzle 24. As discussed above, high-volume ingredient subsystem 16 also provides fluids in the form of chilled carbonated water 164, chilled water 166 and/or chilled high fructose corn syrup 168 (either directly or indirectly) to nozzle 24. Accordingly, as control logic subsystem 14 may regulate (in this particular example) the specific quantities of e.g. chilled carbonated water 164, chilled water 166, chilled high fructose corn syrup 168 and the quantities of the various micro ingredients (e.g. a first portion of a cola syrup, a second portion of a cola syrup, a root beer syrup, and an iced tea syrup), control logic subsystem 14 may accurately control the makeup of beverage 28.

Figure 4B:
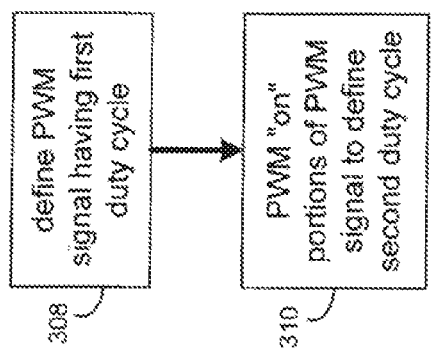
FIG. 4B is a flowchart of a process executed by the control logic subsystem of FIG. 2.

Referring also to FIGS. 4B & 4C and as discussed above, one or more of pump assemblies 270, 272, 274, 276 may be a solenoid piston pump assembly that provides a defined and consistent amount of fluid each time that one or more of pump assemblies 270, 272, 274, 276 are energized by control logic subsystem 14 (via data bus 38). Further and as discussed above, control logic subsystem 14 may execute one or more control processes 120 that may control the operation of beverage dispensing system 10. Accordingly, control logic subsystem 14 may execute a drive signal generation process 122 for generating drive signal 306 that may be provided from control logic subsystem 14 to pump assemblies 270, 272, 274, 276 via data bus 38.

As discussed above, once user 26 makes one or more selections, via user interface subsystem 22, user interface subsystem 22 may provide the appropriate data signals (via data bus 32) to control logic subsystem 14. Control logic subsystem 14 may process these data signals and may retrieve (via data bus 34) one or more recipes chosen from plurality of recipes 36 maintained on storage subsystem 12. Upon retrieving the recipe(s) from storage subsystem 12, control logic subsystem 14 may process the recipe(s) and provide the appropriate control signals (via data bus 38) to e.g. high volume ingredient subsystem 16, micro-ingredient subsystem 18 and plumbing/control subsystem 20, resulting in the production of beverage 28 (which is dispensed into container 30). Accordingly, the control signals received by pump assemblies 270, 272, 274, 276 (via data bus 38) may define the particular quantities of micro-ingredients to be included within beverage 28. Specifically, being that pump assemblies 270, 272, 274, 276 (as discussed above) provide a defined and consistent amount of fluid each time that a pump assembly is energized, by controlling the amount of times that the pump assembly is energized, control logic subsystem 14 may control the quantity of fluid (e.g., micro ingredients) included within beverage 28.

When generating drive signal 306, drive signal generation process 122 may define 308 a pulse width modulated (i.e., PWM) drive signal 320 having a defined voltage potential. An example of such a defined voltage potential is 28 VDC. PWM drive signal 320 may include a plurality of "on" portions (e.g., portions 322, 324, 326) and a plurality of "off" portions (e.g., portions 328, 330) that define a first duty cycle for regulating, at least in part, the flow rate of the pump assembly (e.g., pump assemblies 270, 272, 274, 276). In this particular example, the duration of the "on" portion is "X" and the duration of the "off" portion is "Y". A typical value for "X" may include but is not limited to approximately 15 milliseconds. A typical value for "Y" may include but is not limited to 15-185 milliseconds. Accordingly, examples of the duty cycle of PWM drive signal 320 may range from 50.0% (i.e., 15 ms/30 ms) to 7.5% (i.e., 15 ms/200 ms). Accordingly, if a pump assembly (e.g., pump assemblies 270, 272, 274, 276) requires 15 ms of energy to provide 1.00 mL of the root beer syrup (as discussed above), a duty cycle of 50.0% may result in the pump assembly having a flow rate of 33.33 mL per second. However, adjusting the duty cycle down to 7.5% may result in the pump assembly having a flow rate of 5.00 mL per second. Accordingly. by varying the duty cycle of PWM drive signal 320, the flow rate of the pump assembly (e.g., pump assemblies 270, 272, 274, 276) may be varied.

As some fluids are more viscous than other fluids, some fluids may require additional energy when pumping. Accordingly, drive signal generation process 122 may pulse width modulate 310 at least a portion of the "on" portions of PWM drive signal 320 to define a second duty cycle for at least a portion of the "on" portions of PWM drive signal 320, thus generating drive signal 306. As will be discussed below, the second duty cycle may regulate, at least in part, the percentage of the defined voltage potential applied to the pump assembly. For example, assume that a pump assembly (e.g., pump assemblies 270, 272, 274, 276) is pumping a low viscosity fluid (e.g., vanilla extract). As discussed above, the amount of work that the pump assembly will be required to perform is less than the amount of work required to pump a more viscous fluid (e.g., root beer syrup). Accordingly, drive signal generation process 122 may reduce the duty cycle of the "on" portion (e.g., "on" portion 322, 324, 326) to e.g., 50%, thus lowering the effective voltage to approximately 14.0 VDC (i.e., 50% of the full 28.0 VDC voltage potential). Alternatively, when pumping fluid having a higher viscosity, the duty cycle of the "on" portion (e.g., "on" portion 322, 324, 326) may be increased, thus raising the effective voltage to between 14.0 VDC and 28.0 VDC).

The duration of an "on" portion that results from the second pulse width modulation process may be substantially shorter than the duration of the "on" portion that results from the first pulse width modulation process. For example, assuming that "on" portion 324 has a duration of 15 milliseconds, "on" portion 332 (which is within "on" portion 324) is shown in this illustrative example to have a duration of $^{15}/_{16}$ of a millisecond.

Figure 5:
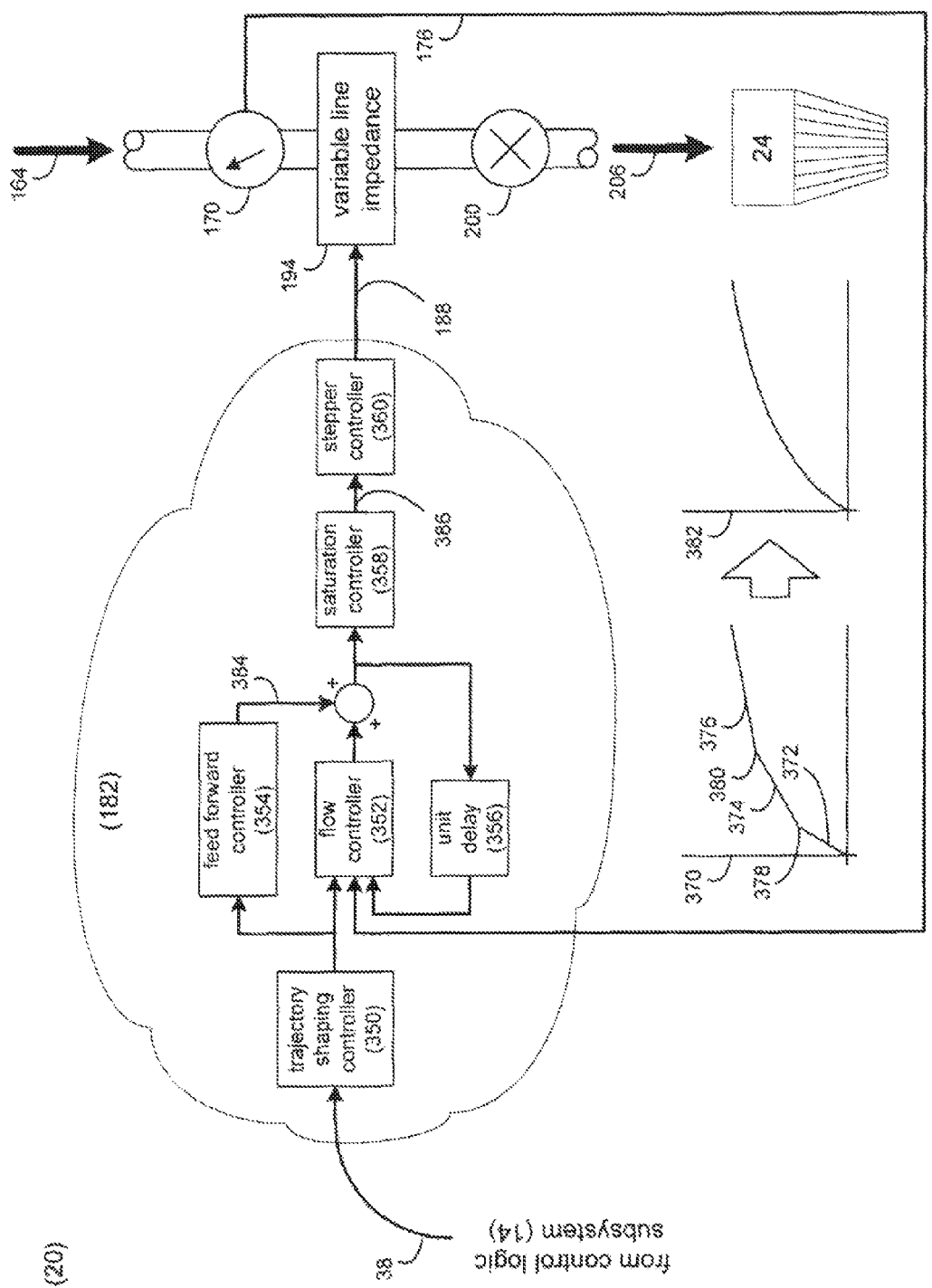
FIG. 5 is a diagrammatic view of a plumbing/control subsystem included within the beverage dispensing system of FIG. 1.

Referring also to FIG. 5, a diagrammatic view of plumbing/control subsystem 20 is shown. While the plumbing/control subsystem described below concerns the plumbing/control system used to control the quantity of chilled carbonated water 164 being added to beverage 28, this is for illustrative purposes only and is not intended to be a limitation of this disclosure, as other configurations are also possible. For example, the plumbing/control subsystem described below may also be used to control e.g., the quantity of chilled water 166 and/or chilled high fructose corn syrup 168 being added to beverage 28.

As discussed above, plumbing/control subsystem 20 may include feedback controller system 182 that receives flow feedback signal 176 from flow measuring device 170. Feedback controller system 182 may compare flow feedback signal 176 to the desired flow volume (as defined by control logic subsystem 14 via data bus 38). Upon processing flow feedback signal 176, feedback controller system 182 may generate flow control signal 188 that may be provided to variable line impedance 194.

Feedback controller system 182 may include trajectory shaping controller 350, flow regulator 352, feed forward controller 354, unit delay 356, saturation controller 358, and stepper controller 360, each of which will be discussed below in greater detail.

Trajectory shaping controller 350 may be configured to receive a control signal from control logic subsystem 14 via data bus 38. This control signal may define a trajectory for the manner in which plumbing/control subsystem 20 is supposed to deliver fluid (in the case, chilled carbonated water 164) for use in beverage 28. However, the trajectory provided by control logic subsystem 14 may need to be modified prior to being processed by e.g., flow controller 352. For example, control systems tend to have a difficult time processing control curves that are made up of a plurality of linear line segments (i.e., that include step changes). For example, flow regulator 352 may have difficulty processing control curve 370, as it consists of three distinct linear segments, namely segments 372, 374, 376. Accordingly, at the transition points (e.g., transition points 378, 380), flow controller 352 specifically (and plumbing/control subsystem 20 generally) would be required to instantaneously change from a first flow rate to a second flow rate. Therefore, trajectory shaping controller 350 may filter control curve 30 to form smoothed control curve 382 that is more easily processed by flow controller 352 specifically (and plumbing/control subsystem 20 generally), as an instantaneous transition from a first flow rate to a second flow rate is no longer required.

Additionally, trajectory shaping controller 350 may allow for the pre-fill wetting and post-fill rinsing of nozzle 20. Specifically, in the event that nozzle 28 is pre-fill wetted with 10 mL of water prior to adding syrup and/or post-fill rinsed with 10 mL of water once the adding of syrup has stopped, trajectory shaping controller 350 may offset the water added during the pre-fill wetting and/or post-fill rinsing by providing an additional quantity of syrup during the fill process. Specifically, as container 30 is being filled with beverage 28, the pre-fill rinse water may result in beverage 28 being initially under-sweetened. Trajectory shaping controller 350 may then add syrup at a higher-than-needed flow rate, resulting in beverage 30 transitioning from under-sweetened to appropriately-sweetened to over-sweetened. However, once the appropriate amount of syrup has been added, the post-fill rinse process may add additional water, resulting in beverage 28 once again becoming appropriately-sweetened.

Flow controller 352 may be configured as a proportional-integral (PI) loop controller. Flow controller 352 may perform the comparison and processing that was generally described above as being performed by feedback controller system 182. For example, flow controller 352 may be configured to receive feedback signal 176 from flow measuring device 170. Flow controller 352 may compare flow feedback signal 176 to the desired flow volume (as defined by control logic subsystem 14 and modified by trajectory shaping controller 350). Upon processing flow feedback signal 176, flow controller 352 may generate flow control signal 188 that may be provided to variable line impedance 194.

Feed forward controller 354 may provide an "best guess" estimate concerning what the initial position of variable line impedance 194 should be. Specifically, assume that at a defined constant pressure, variable line impedance has a flow rate (for chilled carbonated water 164) of between 0.00 mL/second and 120.00 mL/second. Further, assume that a flow rate of 40 mL/second is desired when filing container 30 with beverage 28. Accordingly, feed forward controller 354 may provide a feed forward signal (on feed forward line 384) that initially opens variable line impedance 194 to 33.33% of its maximum opening (assuming that variable line impedance 194 operates in a linear fashion).

When determining the value of the feed forward signal, feed forward controller 354 may utilize a lookup table (not shown) that may be developed empirically and may define the signal to be provided for various initial flow rates. An example of such a lookup table may include, but is not limited to, the following table:

| Flowrate$_{mL/second}$ | Signal$_{to\ stepper\ controller}$ |
|---|---|
| 0 | pulse to 0 degrees |
| 20 | pulse to 30 degrees |
| 40 | pulse to 60 degrees |
| 60 | pulse to 150 degrees |
| 80 | pulse to 240 degrees |
| 100 | pulse to 270 degrees |
| 120 | pulse to 300 degrees |

Again, assuming that a flow rate of 40 mL/second is desired when filing container 30 with beverage 28, feed forward controller 354 may utilize the above-described lookup table and may pulse the stepper motor to 60.0 degrees (using feed forward line 384).

Unit delay 356 may form a feedback path through which a previous version of the control signal (provided to variable line impedance 194) is provided to flow controller 352.

Saturation controller 358 may be configured to disable the integral control of feedback controller system 182 (which, as discussed above, may be configured as a PI loop controller) whenever variable line impedance 194 is set to a maximum flow rate (by stepper controller 360), thus increasing the stability of the system by reducing flow rate overshoots and system oscillations.

Stepper controller 360 may be configured to convert the signal provided by saturation controller 358 (on line 386) into a signal usable by variable line impedance 194. Variable line impedance 194 may include a stepper motor for adjusting the orifice size (and, therefore, the flow rate) of variable line impedance 194. Accordingly, control signal 188 may be configured to control the stepper motor included within variable line impedance.

Figure 6:
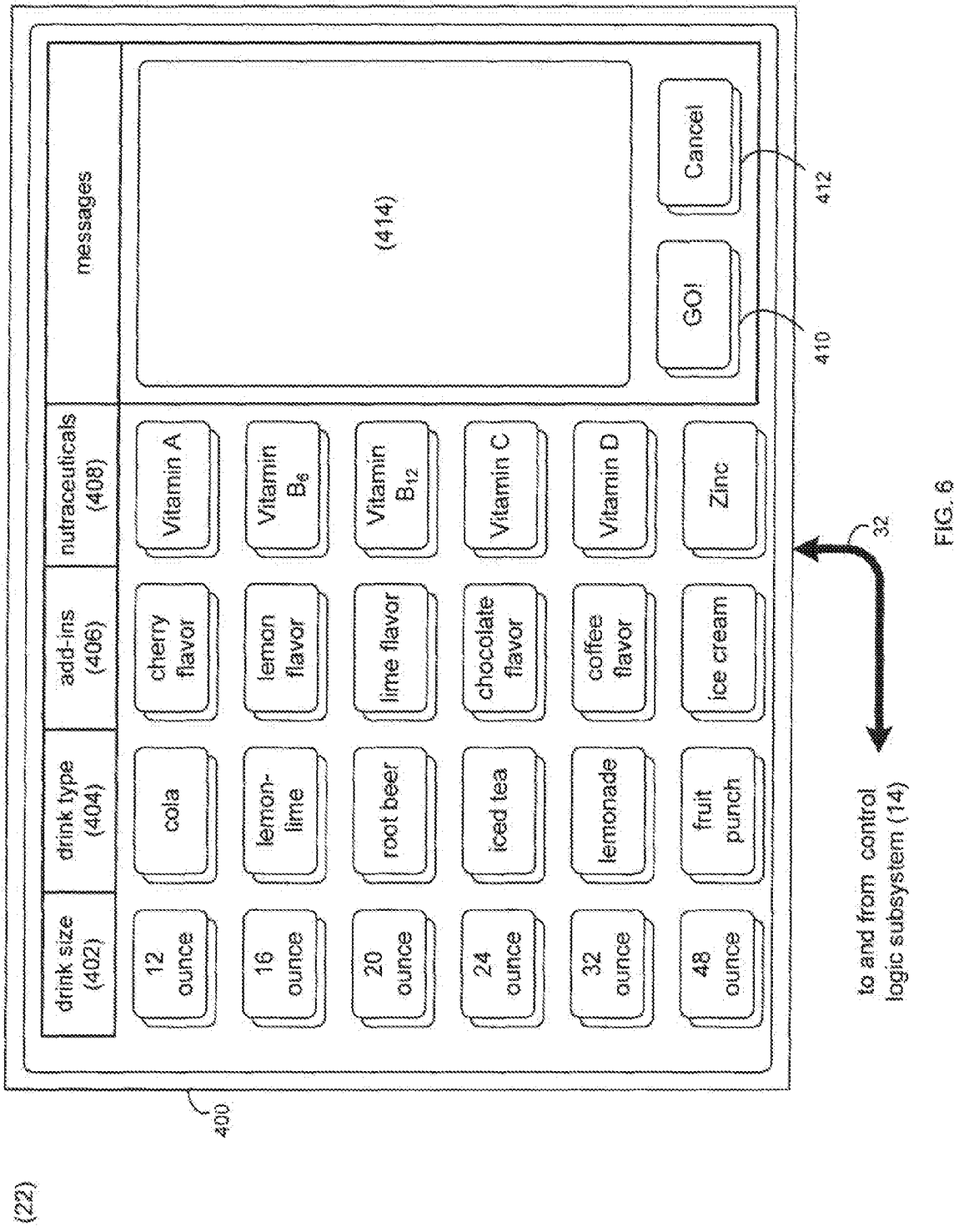
FIG. 6 is a diagrammatic view of a user interface subsystem included within the beverage dispensing system of FIG. 1.

Referring also to FIG. 6, a diagrammatic view of user interface subsystem 22 is shown. User interface subsystem 22 may include touch screen interface 400 that allows user 26 to select various options concerning beverage 28. For example, user 26 (via "drink size" column 402) may be able to select the size of beverage 28. Examples of the selectable sizes may include but are not limited to: "12 ounce"; "16 ounce"; "20 ounce"; "24 ounce"; "32 ounce"; and "48 ounce".

User 26 may be able to select (via "drink type" column 404) the type of beverage 28. Examples of the selectable types may include but are not limited to: "cola"; "lemon-lime"; "root beer"; "iced tea"; "lemonade"; and "fruit punch".

User 26 may also be able to select (via "add-ins" column 406) one or more flavorings/products for inclusion within beverage 28. Examples of the selectable add-ins may include but are not limited to: "cherry flavor"; "lemon flavor"; "lime flavor"; "chocolate flavor"; "coffee flavor"; and "ice cream".

Further, user 26 may be able to select (via "nutraceuticals" column 408) one or more nutraceuticals for inclusion within beverage 28. Examples of such nutraceuticals may include but are not limited to: "Vitamin A"; "Vitamin $B_6$"; "Vitamin $B_{12}$"; "Vitamin C"; "Vitamin D"; and "Zinc".

Once user 26 has made the appropriate selections, user 26 may select "GO!" button 410 and user interface subsystem 22 may provide the appropriate data signals (via data bus 32) to control logic subsystem 14. Once received, control logic subsystem 14 may retrieve the appropriate data from storage subsystem 12 and may provide the appropriate control signals to e.g., high volume ingredient subsystem 16, micro ingredient subsystem 18, and plumbing/control subsystem 20, which may be processed (in the manner discussed above) to prepare beverage 28. Alternatively, user 26 may select "Cancel" button 412 and touch screen interface 400 may be reset to a default state (e.g., no buttons selected).

User interface subsystem 22 may be configured to allow for bidirectional communication with user 26. For example, user interface subsystem 22 may include informational screen 414 that allows beverage dispensing system 10 to provide information to user 26. Examples of the types of information that may be provided to user 26 may include but is not limited to advertisements, information concerning system malfunctions/warnings, and information concerning the cost of various products.

All or a portion of the above-described pulse width modulating techniques may be used to maintain a constant velocity at a nozzle (e.g., nozzle 24). For example, the supply of high fructose corn syrup may be pulse width modulated (using e.g., a variable line impedance or a solenoid valve) so that the high fructose corn syrup is injected into nozzle 24 in high-velocity bursts, thus resulting in a high level of mixing between the high fructose corn syrup and the other components of the beverage.

While the system is described above as being utilized within a beverage dispensing system, this is for illustrative purposes only and is not intended to be a limitation of this disclosure, as other configurations are possible. For example, the above-described system may be utilized for processing/dispensing other consumable products (e.g., ice cream and alcoholic drinks). Additionally, the above-described system may be utilized in areas outside of the food industry. For example, the above-described system may be utilized for processing/dispensing: vitamins; pharmaceuticals; medical products, cleaning products; lubricants; painting/staining products; and other non-consumable liquids/semi-liquids/granular solids. A number of implementations have been described. Nevertheless, it will be understood that various modifications may be made. Accordingly, other implementations are within the scope of the following claims.

What is claimed is:

1. A fluid dispensing system comprising:
a control logic subsystem configured to:
define a PWM drive signal having a defined voltage potential, wherein the PWM drive signal has a plurality of "on" portions and a plurality of "off" portions that define a first duty cycle for regulating, at least in part, a first flow rate of at least one pump assembly; and
pulse width modulate at least a portion of the "on" portions of the PWM drive signal to define a second duty cycle for the at least a portion of the "on" portions of the PWM drive signal, wherein the second duty cycle regulates, at least in part, a percentage of the defined voltage potential applied to the at least one pump assembly; and
a plumbing/control subsystem, wherein the control logic subsystem further configured to measure a second flow rate generated by the plumbing/control subsystem using a flow measuring device.

2. The system of claim 1, wherein the at least one pump assembly is a solenoid piston pump.

3. The system of claim 1, further comprising a feedback controller system, wherein the control logic subsystem further configured to supply a flow feedback signal to the feedback controller system, wherein the feedback controller system compares the flow feedback signal to a desired flow volume.

4. The system of claim 1 wherein the control logic subsystem for converting control signals provided by the at least one microprocessor into a form usable by the micro-ingredient subsystem.

5. The system of claim 4, wherein the control signals define a volume of micro-ingredients to be pumped.

6. The system of claim 1, wherein the at least one pump assembly is configured for use within a beverage dispensing system.

7. The system of claim 1, wherein the at least one pump assembly is rigidly attached to the at least one product module assembly.

8. The system of claim 1, wherein the defined voltage potential is 28 VDC.

9. The system of claim 1, wherein at least one of the "on" portions of the PWM drive signal has a duration of approximately 15 milliseconds.

10. The system of claim 1, wherein at least one of the "off" portions of the PWM drive signal has a duration within a range of 15-185 milliseconds.

11. The system of claim 1, wherein the second duty cycle is within a range of 50-100%.

12. A fluid dispensing system comprising:
a control logic subsystem for converting control signals provided by a microprocessor into a form usable by a micro-ingredient subsystem,
wherein the control signals define a volume of micro-ingredients to be pumped, and
wherein the control logic subsystem configured to:
define a PWM drive signal having a defined voltage potential, wherein the PWM drive signal has a plurality of "on" portions and a plurality of "off" portions that define a first duty cycle for regulating, at least in part, a first flow rate of a pump assembly; and
pulse width modulate at least a portion of the "on" portions of the PWM drive signal to define a second duty cycle for the at least a portion of the "on" portions of the PWM drive signal, wherein the second duty cycle regulates, at least in part, a percentage of the defined voltage potential applied to the pump assembly; and
a plumbing/control subsystem, wherein the control logic subsystem further configured to measure a second flow generated by the plumbing/control subsystem using a flow measuring device.

13. The system of claim 12, wherein the pump assembly is a solenoid piston pump.

14. The system of claim 12, further comprising a feedback controller system, wherein the control logic subsystem further configured to supply a flow feedback signal to the feedback controller system, wherein the feedback controller system compares the flow feedback signal to a desired flow volume.

15. The system of claim 12, further comprising a micro-ingredient subsystem.

16. The system of claim 15, the micro-ingredient subsystem further comprising at least one product module assembly configured to releasably engage at least one product container.

17. The system of claim 15, the micro-ingredient subsystem further comprising at least one product container configured to hold a micro-ingredient.

18. A fluid dispensing system comprising:
   a micro-ingredient subsystem comprising at least one product module assembly configured to releasably engage at least one product container;
   a control logic subsystem for converting control signals provided by at least one microprocessor into a form usable by the micro-ingredient subsystem, wherein the control logic subsystem configured to:
      define a PWM drive signal having a defined voltage potential, wherein the PWM drive signal has a plurality of "on" portions and a plurality of "off" portions that define a first duty cycle for regulating, at least in part, a first flow rate of at least one pump assembly; and
      pulse width modulate at least a portion of the "on" portions of the PWM drive signal to define a second duty cycle for the at least a portion of the "on" portions of the PWM drive signal, wherein the second duty cycle regulates, at least in part, a percentage of the defined voltage potential applied to the at least one pump assembly; and
   a plumbing/control subsystem, wherein the control logic subsystem further configured to measure a second flow generated by the plumbing/control subsystem using a flow measuring device.

19. The system of claim 18, wherein the pump assembly is a solenoid piston pump.

20. The system of claim 18, further comprising a feedback controller system, wherein the control logic subsystem further configured to supply a flow feedback signal to the feedback controller system, wherein the feedback controller system compares the flow feedback signal to a desired flow volume.

21. The system of claim 18, wherein the control signals define a volume of micro-ingredients to be pumped.

22. The system of claim 18, the micro-ingredient subsystem further comprising at least one product container configured to hold a micro-ingredient.

* * * * *